United States Patent [19]

Ajima

[11] Patent Number: 5,293,224
[45] Date of Patent: Mar. 8, 1994

[54] WHITE BALANCE CONTROL SYSTEM
[75] Inventor: Kohsuke Ajima, Tokyo, Japan
[73] Assignee: Pioneer Electronic Corporation, Tokyo, Japan
[21] Appl. No.: 911,374
[22] Filed: Jul. 13, 1992

Related U.S. Application Data

[63] Continuation of Ser. No. 646,040, Jan. 28, 1991, abandoned.

[30] Foreign Application Priority Data

Jan. 30, 1990 [JP] Japan ................... 2-21489

[51] Int. Cl.⁵ .............................................. H04N 9/31
[52] U.S. Cl. ..................................... 348/656; 348/778
[58] Field of Search .................... 358/29, 32, 60, 64, 358/164, 170, 231, 237

[56] References Cited

U.S. PATENT DOCUMENTS

| | | | |
|---|---|---|---|
| 3,479,448 | 11/1969 | Kollsman | 358/29 |
| 3,877,068 | 4/1975 | Kosaka et al. | 358/29 |
| 4,379,292 | 4/1983 | Minato | 358/29 |
| 4,631,576 | 12/1986 | St. John | 358/64 |
| 4,700,218 | 10/1987 | Thomsen | 358/10 |
| 4,706,108 | 11/1987 | Kumagai | 358/29 |
| 4,739,396 | 4/1988 | Hyatt | 358/60 |
| 4,742,387 | 5/1988 | Oshima | 358/29 |
| 4,746,970 | 5/1988 | Hosokawa | 358/29 |
| 4,962,418 | 10/1990 | Kamaga | 358/27 |
| 4,977,446 | 12/1990 | Shiomi | 358/64 |
| 4,999,703 | 3/1991 | Henderson | 358/60 |

Primary Examiner—Tommy P. Chin
Assistant Examiner—Bryan S. Tung
Attorney, Agent, or Firm—Nikaido, Marmelstein, Murray & Oram

[57] ABSTRACT

A quality of blue light projected on a screen is detected. A ratio of the detected quantity of the light to a whole quantity is calculated. The calculated ratio is compared with a reference ratio, and a deviation of the calculated ratio from the reference ratio is corrected so as to provide a white balance.

2 Claims, 6 Drawing Sheets

WHITE BALANCE CONTROL SYSTEM

This application is a continuation of application Ser. No. 646,040 filed Jan. 28, 1991 now abandoned.

BACKGROUND OF THE INVENTION

The present invention relates to a white balance control circuit for a projection television receiver, and more particularly to a white balance control circuit for automatically controlling balance of color when quantities of light of the three primary colors decrease with time.

In recent years, in order to provide a wider screen for a television receiver, it has become common to employ a projection television system.

A rear projection system which is one of the systems of the projection television is shown in FIG. 5. A picture tube 1 produces a pictorial image which is expanded by a lens 2. The image is reflected on opposing reflecting mirrors 3 and 4 and reproduced on a light-transmissible screen 5.

FIG. 6 shows another projection television receiver where the image is reproduced on a reflecting screen 6 from the front thereof.

There are other types of projection system such as a refraction system shown in FIG. 7 and a reflection system shown in FIG. 8 dependent on the type of picture tubes 1. In the refraction system, the lens 2 is provided in front of a fluorescent screen of the picture tube 1. The lens 2 expands and reproduces the image on the reflecting screen 6.

To the contrary, in the reflection system, a picture tube 8 has a fluorescent screen 9 and a reflecting mirror 10 provided in the tube 8. The image reflected on the reflecting mirror 10 is expanded through a Schmidt lens 11 and reproduced on the reflecting screen 6.

In accordance with the rear projection system shown in FIG. 5, since the picture tube 1 and the lens 2 can be disposed adjacent the screen 6, the television receiver can be reduced in size. The light-transmissible screen 5 is made of a material having a high light transmittance, such as a Fresnel lens and a lenticular sheet.

In the projection color television receiver, there are three picture tubes 1 (8) for red (R), green (G) and blue (B). White balance is obtained by adjusting ratio of light between the tubes into red light of 30%, green light of 59%, and blue light of 11%. However, the fluorescent screen 7 (9) of the picture tube has a low luminous efficacy particularly for blue. Accordingly, in order to maintain the balance with the other colors, current i supplied to the blue picture tube is increased. Thus the joule heat caused by the current i heats the screen of the blue picture tube, thereby quickly deteriorating it.

Hence, as the screen of the blue picture tube deteriorates with time, the luminous efficacy of the blue light is further decreased. As a result, the quantities of red and green lights relatively increases. The picture on the screen 6 will thus gradually assume a yellowish color. The color can be corrected by manipulating a dial for controlling the color balance. However, the adjusting operation is complicated.

SUMMARY OF THE INVENTION

The object of the present invention is to provide a white balance control system where the above-described problem is solved so as to constantly provide a pictorial image in appropriate color.

According to the present invention, there is provided a while balance control system for a color television receiver having a red output control circuit, green output control circuit and a blue output control circuit, and projecting means for projecting beams of each color on to a screen.

The system comprises detector means for detecting quantity of at least one color light projected on the screen, calculator means for calculating ratio of the detected quantity of the color light to a whole quantity, a memory storing a reference ratio for obtaining a white balance, comparing means for comparing the calculated ratio with the reference ratio stored in the memory, correcting means for correcting a deviation of the calculated ratio from the reference ratio so as to coincide with the reference ratio.

In an aspect of the invention, the detector means detects quantity of light including the three colors. The system further comprises separating means for separating the quantity of the light into respective quantities of the three colors, and the calculator means being arranged to calculate respective ratios of the three colors.

The other objects and features of this invention will become understood from the following description with reference to the accompanying drawings.

DETAILED DESCRIPTION OF THE PREFERRED EMBODIMENTS

Figure 1:
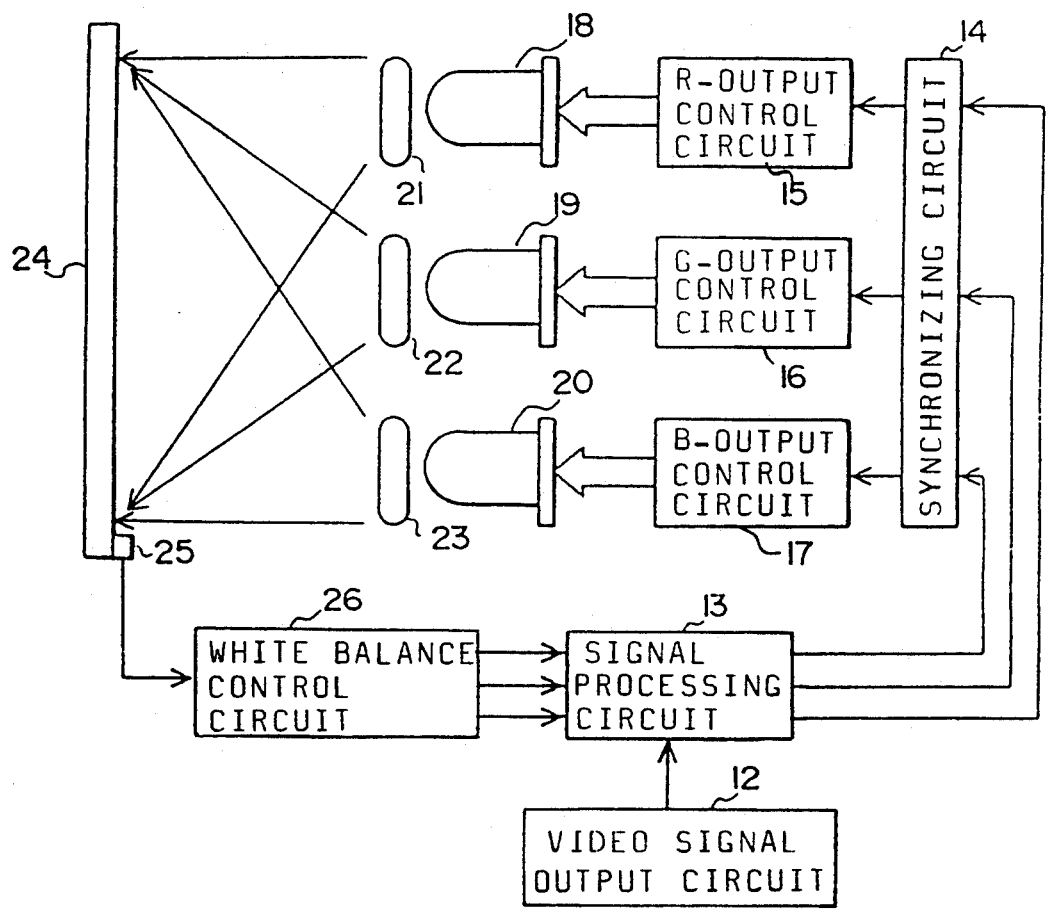
FIG. 1 is a block diagram of a control system for a projection display television receiver provided with a cathode-ray display.

FIG. 1 shows a projection television receiver to which a white balance control system of the present invention is applied. The receiver has CRT (cathode-ray tube) displays which project pictorial images from the front thereof. The control system of the television receiver comprises a video signal output circuit 12, a signal processing circuit 13, a synchronizing circuit 14, color output control circuits 15, 16 and 17. The video signal output circuit 12 is connected to a video signal source such as a television tuner, CATV tuner, video tape recorder and video disk player, so as to be fed with video signals. The signal processing circuit 13 produces red, green and blue video signals in accordance with the output signal of the output circuit 12. The synchronizing circuit 14 controls the projection timing of the video signals applied to the control circuits 15 to 17 to prevent deflection of color and decrease of resolution.

The video signals are applied to the R-output control circuit 15, G-output control circuit 16 and a B-output control circuit 17, the output signals of which are fed to respective picture tubes 18, 19 and 20 so as to control the light emitting operation thereof. As a result, each of the picture tubes 18, 19 and 20 produces an image and which is projected on to a light-transmissible screen 24 through a corresponding one of projection lenses 21, 22 and 23.

Light quantity sensors 25 are provided on the screen 24, for example at the four corners of the screen where the pictorial image is not affected, to detect the quantity of light projected on the light transmissible screen 24. The sensor 25 may be embedded in a black striped portion of a lenticular sheet if the sensor is small enough. A pickup unit (camera), photodiode, phototransistor, photoelectric converter elements each having different spectral sensitivity characteristics, or further, a packaged color sensor may be used as the light quantity sensor 25. A color sensor PD170VI manufactured by Sharp Co. Ltd may also be used.

The output signals of the light quantity sensors 25 are fed to a white balance control circuit 26 to adjust intensity of beam of each primary color so as to reproduce appropriate white on the screen in a wide range from high luminance to low luminance.

Figure 2:
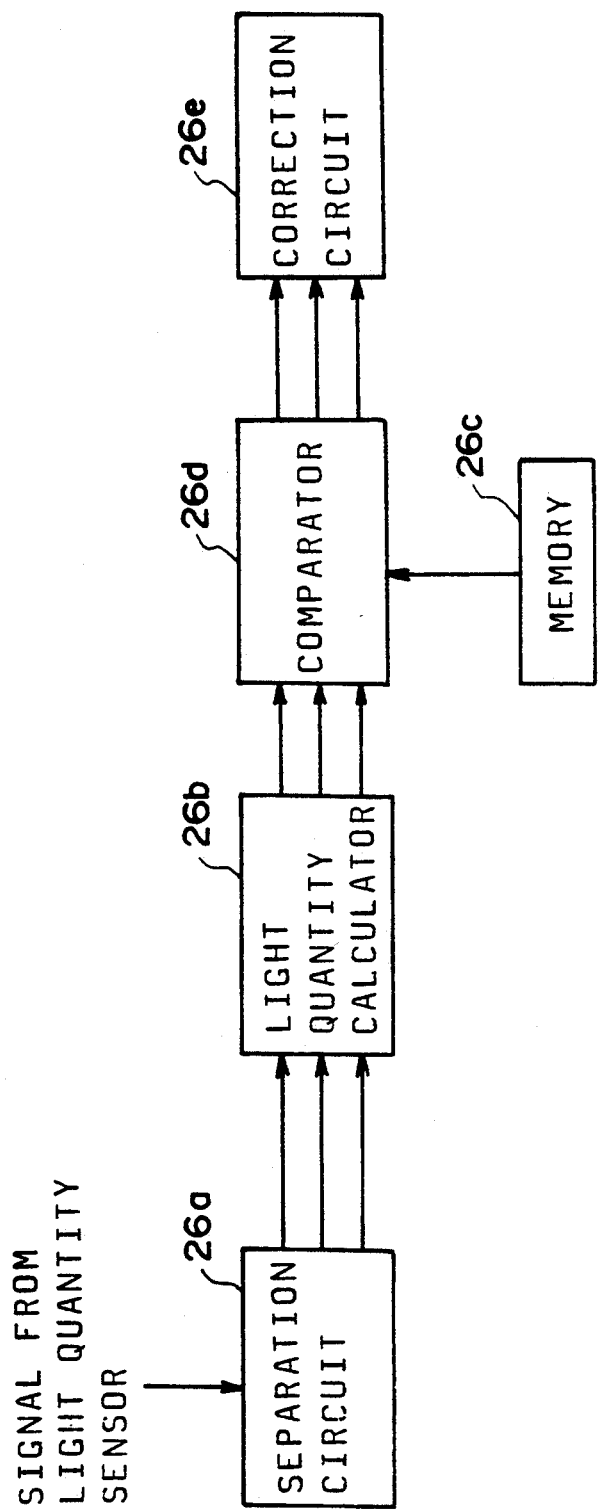
FIG. 2 is a block diagram of a white balance control circuit provided in the system.

Referring to FIG. 2, the white balance control circuit 26 has a color separation circuit 26a for splitting the signal detected by the light quantity sensor 25 into red, green and blue components. The ratio of quantities of light corresponding to each component is calculated by a light quantity calculator 26b. The white balance control circuit further has a memory 26c such as an EEPROM wherein a reference light quantity ratio between the red, green and blue components is stored. The light quantity ratio calculated in the light quantity calculator 25b is compared with the reference light quantity ratio by a comparator 26d.

The reference ratio stored in the memory 26c during the production of the receiver is obtained as follows. After adjustments such as conversence are completed, a standard signal is projected on the screen 24 and the light quantity is detected by the sensors 25. A standard ratio is calculated in dependency on the detected light quantity of the standard signal and converted into data corresponding to each quantity of light.

The white balance controlling circuit 26 is further provided with a correction circuit 26e for correcting the actual ratio when the ratio calculated by the calculator 26b does not coincide with the reference ratio stored in the memory 26c. The correction circuit 26e corrects the actual ratio based on the smallest light quantity in the three colors which decreases the most.

Figure 3:
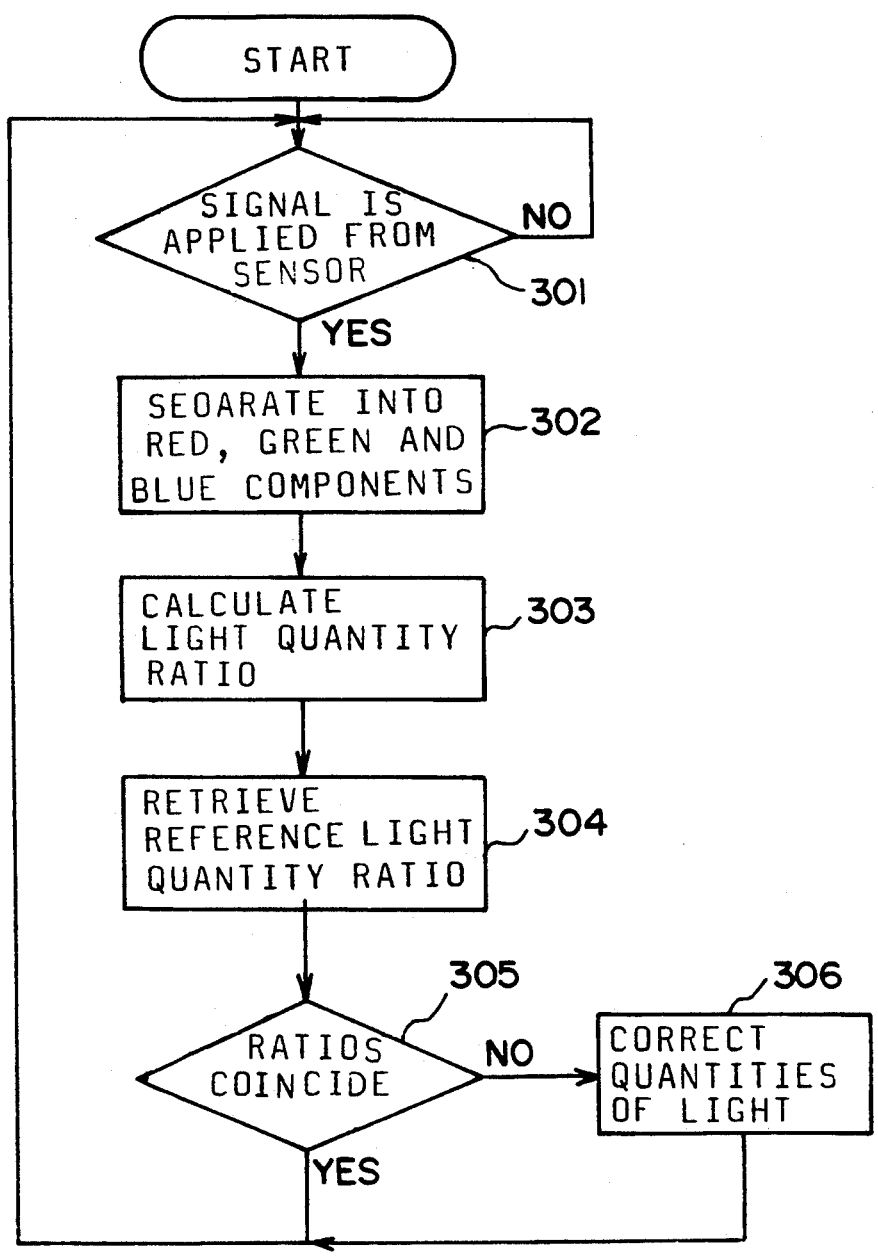
FIG. 3 is a flowchart showing the operation of the white balance control circuit.

The operation of the white balance circuit 26 is described with reference to FIG. 3.

At a step 301, it is determined whether the signal is fed from the light quantity sensor 25. When the signal is fed, the signal is separated into red, green and blue components in the separation circuit 26a (step 302). At a step 303, the light quantity calculator 26b calculates the ratio of the quantities of light corresponding to red, green and blue. Thereafter, the reference light quantity ratio in the memory 26c is read (step 304) and compared with the calculated ratio (step 305). If the ratios match, the program returns to the step 301 to repeat the program.

When the calculated ratio does not coincide with the reference ratio, the correction section 26e is operated to correct the actual ratio. More particularly, an appropriate white balance is obtained when the percentages of red, green and blue lights are 30%, 59% and 11%, respectively. When the quantity of light of one of the color components, for example the blue, decreases, the quantities of light of other components, red and green, are decreased so as to maintain the quantity of light of the blue component at 11%. Thus, the images reproduced on the screen are always adjusted to appropriate colors.

Figure 4:
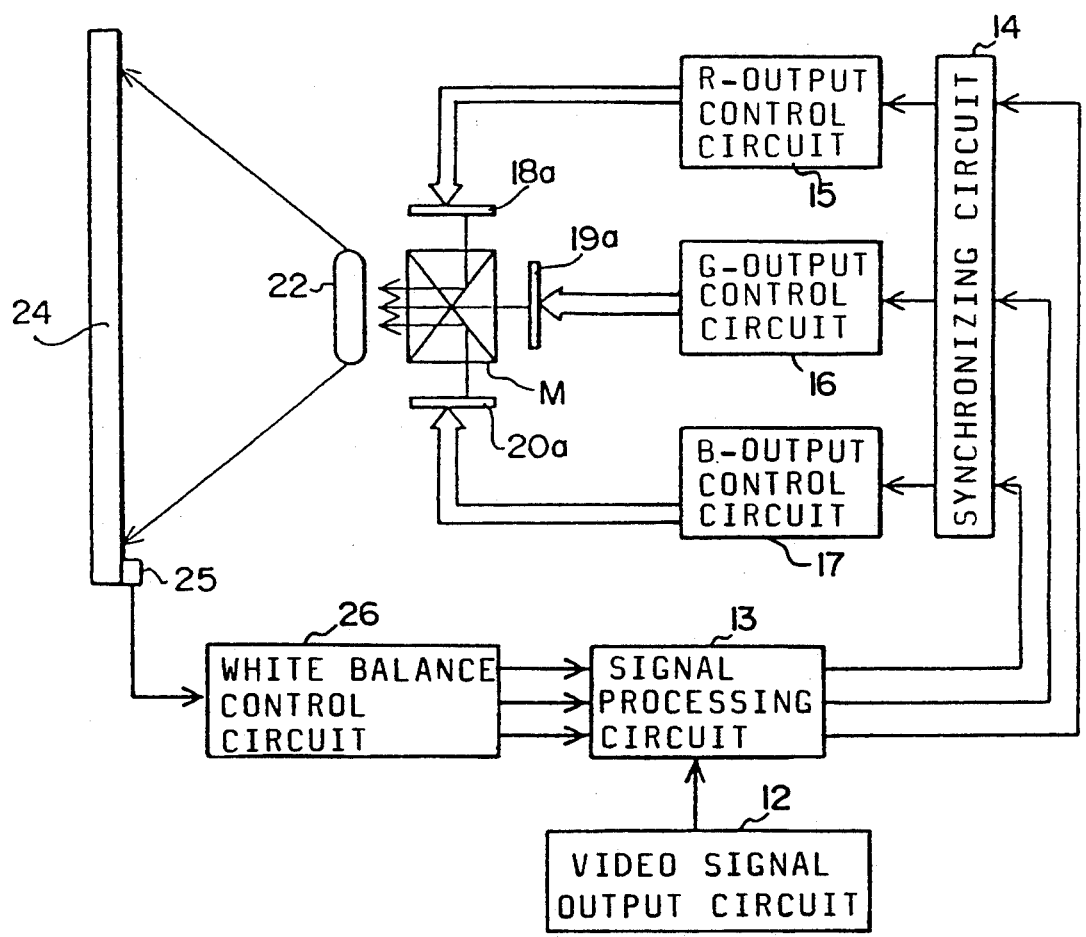
FIG. 4 is a block diagram of a control system of a projection display television receiver having a liquid crystal display, as a second embodiment of the present invention.
Figure 5:
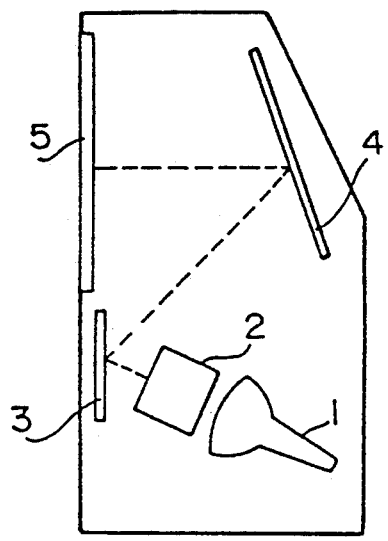
FIG. 5 is a schematic diagram of a conventional rear projection television receiver.
Figure 6:
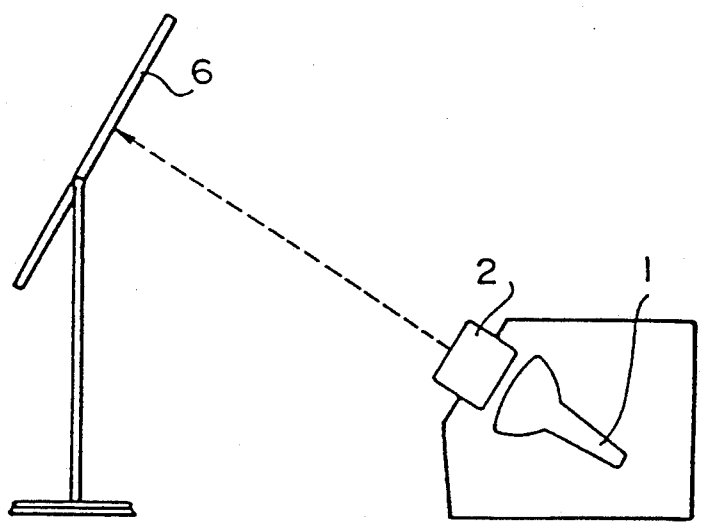
FIG. 6 is a schematic diagram of a conventional front projection television receiver.
Figure 7:
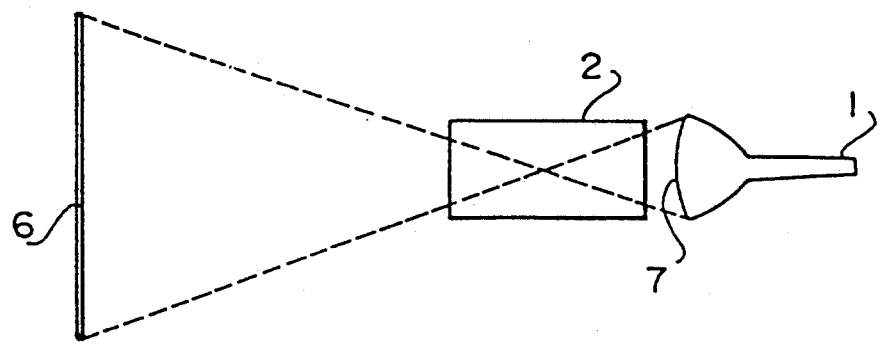
FIG. 7 and 8 show other projection television receivers.
Figure 8:
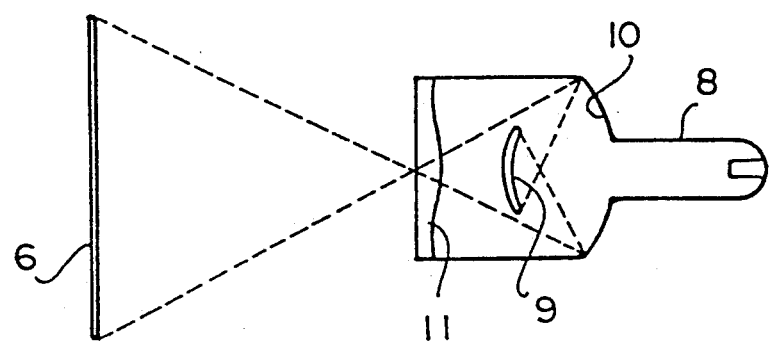

FIG. 4 shows the second embodiment of the present invention where a liquid crystal display is provided instead of the CRT display. The same numerals as those in FIG. 1 designate the same parts in FIG. 4 as FIG. 1, and therefore, the description thereof is omitted.

The video signals controlled by the R-output control circuit 15, G-output control circuit 16 and B-output control circuit 17 are applied to liquid crystal display panels 18a, 19a and 20a, respectively, thereby reproducing images on each panel. Dichroic mirrors M serve as prisms which transmit the image on each display panel 18a, 19a and 20a to the lens 22.

As described above, the ratio between the quantities of light corresponding to the primary color components are corrected based on the quantity of light of the most deteriorated color component.

Since picture elements of the liquid crystals provided in the multiple liquid crystal display panels are apt to deteriorate faster, the present embodiment is more effective in controlling the color of the image reproduced on the screen than in the television receiver provided with CRT displays. If the liquid crystal itself deteriorates, the contrast of the images weakens. However, an appropriate balance of color can be obtained by darkening the entire image.

Although in the hereinbefore described embodiments, the light quantity sensor is provided for detecting quantity of light of all of the color components, red, green and blue, the embodiments may be modified to detect only the quantity of light of the color which most easily deteriorates, namely blue, thus enabling to reduce the cost.

The present invention may be applied to rear projection television receivers and to ordinary television receivers.

From the foregoing, it will be understood that the present invention provides a white balance control system wherein a ratio between the quantities of lights of the primary color components is automatically corrected in accordance with the decrease of the quantity of light projected on the screen, so that a desirable color of the images is always obtained.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A white balance control system of a projector having a red output control circuit, green output control circuit and a blue output control circuit, and three cathode ray tubes for projecting beams of three colors onto a screen respectively, comprising:
 a detector for detecting a quantity of light of the beams;
 calculator means for calculating an actual ratio of the detected quantity of light to a whole quantity;
 a memory storing a reference ratio for obtaining a white balance;
 comparing means for comparing the calculated actual ratio with the reference ratio stored in the memory;

separating means for separating the quantity of light into respective quantities of the three colors, wherein said calculator means is configured to calculate respective actual ratios of the three colors;

correcting means for reducing, when one of the calculated actual ratios does not coincide with the reference ratio, light quantities of two colors other than a color which has a smallest light quantity so as to coincide the calculated actual ratio with the reference ratio; and signal processing means for processing video signals applied to the three output control circuits in accordance with the corrected quantity.

2. A white balance control system of a projector having a red output control circuit, green output control circuit and a blue output control circuit, and three liquid crystal display panels for projecting beams and three colors onto a screen respectively, comprising:

a detector for detecting quantity of light of the beams;

calculator means for calculating an actual ratio of the detected quantity of light to a whole quantity;

a memory storing a reference ratio of the beams for obtaining a white balance;

comparing means for comparing the calculated actual ratio with the reference ratio stored in the memory;

separating means for separating the quantity of light into respective quantities of the three colors, wherein said calculator means is configured to calculate respective actual ratios of the three colors;

correcting means, when one of the calculated actual ratios does not coincide with the reference ratio, for reducing light quantities of two colors other than a color having a smallest light quantity so as to coincide the calculated actual ratio with the reference ratio; and signal processing means for processing video signals applied to the three output control circuits in accordance with the corrected quantity.

* * * * *